United States Patent [19]

Lassila et al.

[11] Patent Number: 5,453,478
[45] Date of Patent: Sep. 26, 1995

[54] ORTHO-ALKYLATED TOLIDINES

[75] Inventors: Kevin R. Lassila, Allentown; Michael E. Ford, Coopersburg; Kenneth M. Kem, Emmaus; Susan M. Clift, Lansdale, all of Pa.

[73] Assignee: Air Products and Chemicals, Inc., Allentown, Pa.

[21] Appl. No.: 28,494

[22] Filed: May 4, 1993

[51] Int. Cl.⁶ .................................................. C08G 18/10
[52] U.S. Cl. ............................ 528/64; 528/52; 528/61; 528/68; 528/76; 528/80; 528/85; 521/155; 521/159; 521/163; 252/182.12; 252/182.13; 564/307; 564/309
[58] Field of Search ...................... 528/52, 68, 61, 528/64, 76, 80, 85; 521/155, 159, 163; 252/182.12, 182.11; 564/307, 309

[56] References Cited

U.S. PATENT DOCUMENTS

| | | |
|---|---|---|
| 2,115,884 | 4/1938 | Schöllkopf . |
| 2,762,845 | 9/1956 | Stroh et al. . |
| 3,275,690 | 9/1966 | Stroh et al. . |
| 3,428,610 | 2/1969 | Klebert . |
| 4,218,543 | 8/1980 | Weber et al. . |
| 4,351,958 | 9/1982 | Takahato et al. . |
| 4,446,329 | 5/1984 | Waller ........................................ 585/458 |
| 4,482,690 | 11/1984 | Orphanides . |
| 4,740,620 | 4/1988 | Dixon et al. ............................. 564/409 |
| 4,745,228 | 5/1988 | Burgoyne, Jr. et al. ................. 564/305 |
| 4,760,184 | 7/1988 | Pierantozzi ............................... 564/409 |

FOREIGN PATENT DOCUMENTS

| | | |
|---|---|---|
| 1051271 | 2/1959 | Germany . |
| 846226 | 8/1960 | United Kingdom . |

Primary Examiner—James J. Seidleck
Assistant Examiner—John M. Cooney, Jr.
Attorney, Agent, or Firm—Russell L. Brewer; Mary E. Bongiorno

[57] ABSTRACT

This invention relates to o-tolidines which have a tert-butyl substituent ortho to an amine group. These compositions are represented by the formula:

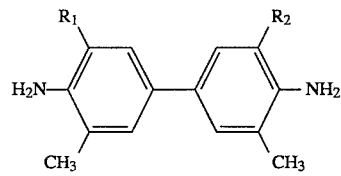

where $R_1$=i-propyl, or t-butyl, and
where $R_2$=hydrogen, i-propyl, or t-butyl.

The compositions are useful in the preparation of polyepoxide resins as well as polyurethanes, polyamides and polyimides.

5 Claims, 1 Drawing Sheet

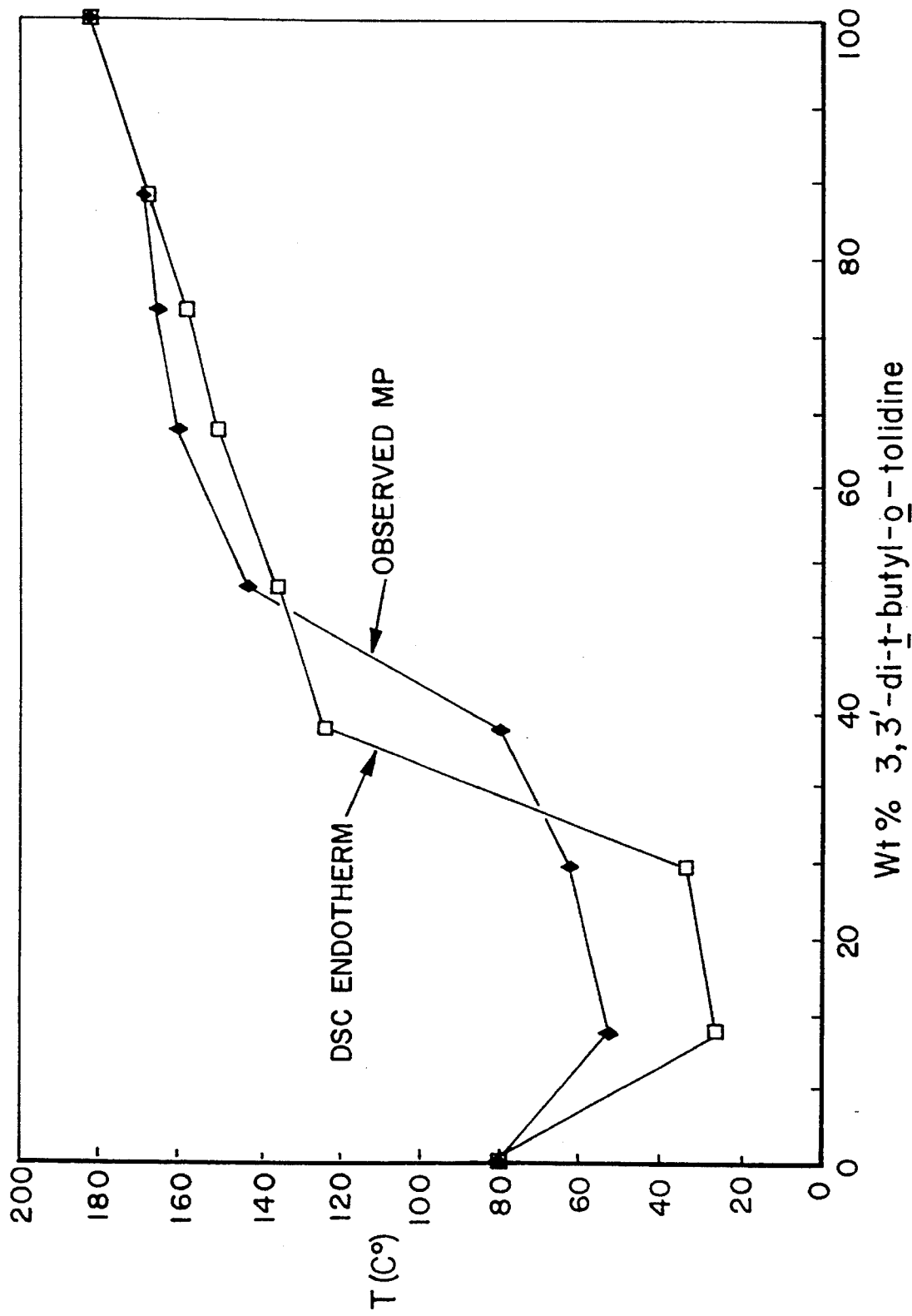

ORTHO-ALKYLATED TOLIDINES

FIELD OF THE INVENTION

This invention pertains to o-alkylated tolidines.

BACKGROUND OF THE INVENTION o-Tolidine is useful in preparing polyurethanes, epoxies, polyamides, and polyimides and is the source of several property enhancements for these systems. However, its properties also create a number of processing problems. For example, it has a high melting point (130° C.) and this precludes its use as a RIM (Reaction Injection Molding) chain extender in polyurethanes. This high melting point complicates its use as an epoxy curative. The high amine reactivity complicates processing. Another complicating factor is that amine reactivity is not differential and many applications may require moderation to control cure profiles. Lastly, o-tolidine is an animal carcinogen and that fact also detracts considerably from its attractiveness in many applications.

Alkylation of a variety of aromatic amines has been reported to alter properties, e.g., amine reactivity. Typically alkylated amines are formed by contacting the aromatic amines with a hydrocarbon radical-providing source such as an olefin or alcohol. Such alkylation methods are widely known. Reference is made to the following patents which are representative of the processes for the alkylation of aromatic amines:

Stroh, et al. in U.S. Pat. Nos. 3,275,690; 2,762,845; West German AS 1051,271 and Japanese 38-4569 disclose various processes for the manufacture of alkylated aromatic amines by effecting reaction between an aromatic amine and an olefin. Representative aromatic amines for alkylation include primary amines, such as, aniline, toluidines, xylidines; secondary amines such as diphenylamine and diamines such as m-phenylenediamine and various toluenediamine isomers. In the '690 patent, various Friedel-Crafts catalysts such as aluminum chloride, zinc chloride, boron fluoride and other halogen compounds are combined with aluminum to effect the catalytic reaction. In the '845 patent, aluminum powder is used as a component of the catalyst system. The West German '271 patent uses various bleaching earths and montmorillonite as the catalyst.

British patent 846,226 and U.S. Pat. Nos. 2,115,884; 4,351,958; 4,446,329; and 4,740,620 show the use of heterogeneous catalysts in the alkylation of aromatic amines. The '884 patent discloses the ring alkylation of aromatic hydrocarbons using activated hydrosilicates and hydrated silicic acids, commonly referred to as bleaching earths. The '958 patent discloses iron oxides as catalysts for such alkylation and the '329 patent discloses the use of a metal cation salt of a perfluorosulfonic acid polymer, the polymer typically being sold under the trademark Nafion®. The '620 patent discloses the reaction of aromatic amines with olefins in the presence of acidic crystalline alumino-silicates to produce the alkylated counterparts thereof.

U.S. Pat. Nos. 4,740,620; 4,745,223; and 4,760,184 disclose alkylation of aromatic amines by reaction with olefins in the presence of highly acidic zeolites. Mononuclear and bridged amines are suggested as candidates for alkylation.

U.S. Pat. No. 4,482,690 discloses the curing of polyurethane/urea elastomers using alkylated aromatic amines. The '690 patent discloses the use of tert-butyl-m-phenylenediamine as a chain extending agent. Delayed reactivity of the substituted aromatic amine is noted as an advantage.

U.S. Pat. Nos. 3,428,610 and 4,218,543 note the use of mono and diethyltoluenediamine as delayed action chain extenders for polyurethane/urea elastomers.

U.S. Pat. No. 4,482,690 discloses the use of tert-butyl-toluenediamines as delayed action chain extenders for polyurethane/urea elastomers. The mono-tert-butyl-2,6-toluenediamine was noted as having excellent delayed reaction characteristics.

SUMMARY OF THE INVENTION

This invention relates to o-tolidine compositions having an isopropyl or tert-butyl group ortho to at least one amine group. The compositions are represented by the structure:

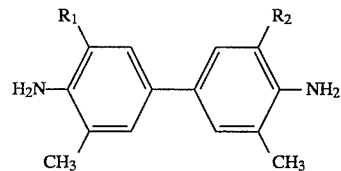

where $R_1$=isopropyl or t-butyl.
where $R_2$=hydrogen, isopropyl or t-butyl.

There are many advantages associated with these tert-butyl o-tolidines and these include:

- an ability by addition of isopropyl and tert-butyl groups to moderate and decrease the rate of viscosity build in cast polyurethane/urea elastomer manufacture;
- an ability to decrease melting points particularly for the mixed tert-butyl o-tolidine products;
- an ability to provide a high degree of control of amine reactivity through the extent of isopropyl, and particularly, tert-butyl substitution;
- an ability to alter and reduce the toxicity of the materials;
- an ability to enhance the water resistance and solubility of polymers in which the o-tolidine compositions are used; and
- an ability to enhance physical properties; e.g., tensile strength, tear strength, etc., in polymers such as polyurethanes.

DRAWINGS

The drawing is a melting point diagram for mono and di-t-butyl-o-tolidines and mixtures thereof.

DETAILED DESCRIPTION OF THE INVENTION

The alkylation of the o-tolidine reactant to produce an isopropyl or t-butyl -o-tolidine is achieved by reacting o-tolidine with the olefins, propylene or isobutylene, in the presence of a solid acid catalyst.

The catalysts used to produce the compositions of this invention generally are those which are solid phase and which have sufficient catalytic activity to effect ring alkylation. These catalysts should be highly acidic, although the degree of acidity of the catalysts may vary from one catalyst system to another. The only criteria is that the catalyst selected is sufficiently reactive to effect alkylation of the aromatic compound with the propylene or isobutylene employed to effect alkylation. Examples of solid phase catalyst systems which are sufficiently active for effecting ring-alkylation of the tolidine include acidic zeolites, primarily those zeolites which have a pore size from 6 to 15 Angstroms, and preferably in excess of 7, and which have been ion exchanged with hydrogen or an acidic metal, e.g., lanthanum or other rare earth metal. Examples of such zeolite catalysts include mordenite and the Y and X faujasites.

The zeolites also can be altered by the technique of dealumination, i.e., a technique where the alumina content is decreased in the zeolite. Removal of alumina from a zeolite structure has the effect of increasing the acidity of the catalyst system and also one of enlarging the pore size of the zeolite. Dealumination can be effected by acid treatment, chelation, dehydration, or steam treatment of the zeolite. A Si to Al ratio of a dealuminated zeolite typically will range from about 5 to 25:1.

These zeolites can be exchanged with various ions, preferably hydrogen or with a rare earth metal i on such as lanthanum, praeseodymium, and the like. The use of various ions in the structure will alter the acidity of the catalyst and therefore the reactivity in the alkylation reaction. Alkali metal ions create a zeolite catalyst which is less acidic and high temperatures may be required to effect alkylation.

It should be recognized by those familiar with the utilization of zeolites in the alkylation of aromatic compounds that the pore size will vary between zeolites, and appropriately sized zeolites must be used to accommodate the synthesis of the higher molecular weight ring-alkylated o-tolidines. In most cases for alkylation, the pore size of the zeolite should be in excess of 7 Angstroms.

Other heterogeneous solid phase catalyst systems which can be used include montmorillonite, gamma-alumina, silica-alumina, and the like.

The alkylation of o-tolidine with propylene or isobutylene is carried out at a temperature ranging from about 100° to 350° C. and typically at temperatures of from 150° to 275° C. The temperature is controlled within this range at a temperature which is sufficiently high for the reactants to be reactive in the presence of the catalyst. Temperature control is an important variable for producing a reaction product with a high conversion of o-tolidine to ring-alkylated product. Pressures from about 200–2000 psig and preferably from about 500–1000 psig are used.

The reaction of propylene or isobutylene with o-tolidine may be carried out in a fixed bed reactor or batch reactor. In terms of fixed bed reaction, the reaction time can be expressed as a liquid hourly space velocity of feed components to the reactor and such expression will generate an LHSV of from 0.05 to 4 hours$^{-1}$ and usually from 0.1 to 1 hr$^{-1}$. Often an inert solvent is used as a carrier; an example is 1,4-dioxane. The alkylation of o-tolidine with propylene or isobutylene can be carried out in a batch operation as taught in the art and reaction times will range from 0.5 to 90 hours, and preferably from 1–24 hours. Typically temperatures and pressures will be similar to those in fixed bed catalytic reactions.

In the practice of preparing polyurethane-urea elastomers using the o-tolidines as chain extenders, one may react (a) an organic polyisocyanate (b) a compound having active hydrogen atoms as determined by the Zerewitinoff method and (c) the tert-butyl o-tolidine chain extender. The general method of forming the elastomer is to form a prepolymer containing free isocyanate groups, typically from 1 to 25 percent by weight free isocyanate groups and then react the prepolymer with a stoichiometric quantity of aromatic amine chain extending agent. In this technique, the percent free isocyanate content of the prepolymer will vary depending upon the type of molding to be effected. In the manufacture of small, hand molded parts, higher levels of free isocyanate may be tolerated, e.g., from 15 to 23 percent by weight. In the manufacture of large, soft components, lower isocyanate content may be utilized, e.g., from 5 to 15 percent isocyanate by weight.

Another technique used in formulating polyurethane-urea elastomers is referred to as the one shot technique. In this type of manufacture, the reactants, commonly referred to as the A and B portions, are blended in a nozzle and immediately injected into a mold. In many cases a portion of the polyol and amine are blended together so that the proportions of components A and B to the nozzle are balanced.

Polyisocyanates used as starting components for preparing the polyurethane/urea elastomers may be any of the aliphatic, cycloaliphatic, araliphatic, aromatic or heterocyclic isocyanates which are commonly used in the industry to form the polyurethane/urea elastomer systems. As a general rule it is particularly preferred to use aliphatic and aromatic polyisocyanates with the chain extender system described herein and these include 2,4- and 2,6-toluenediisocyanate; others include polyphenylpolymethylene polyisocyanate, diphenylmethane diisocyanate, naphthalene-1,5-diisocyanate, hexylenediisocyanate, cyclohexanediisocyanate and the like.

Reactants (b) used for forming the polyurethane-urea elastomers are compounds which have active Zerewitinoff hydrogen atoms. These typically are polyols, e.g. polyether and polyester polyols. Although the molecular weight of the polyol normally used is from about 250 to 10,000, typically the molecular weight of the polyol ranges from 1,000 to about 6,000. Examples of polyols suited for forming polyurethane elastomers include polyether polyols such as poly(propylene glycol), poly(ethylene glycol), and poly(tetramethylene glycol) and polyester polyols. Polyester polyols are formed by reacting polycarboxylic acids with various polyols. These systems are well known in the art and include, for example, systems derived from polycarboxylic acids such as succinic acid, adipic acid, phthalic acid, isophthalic acid and polyols such as glycerol, ethylene glycol, propylene glycol, 1,4-butanediol, trimethylolpropane, and pentaerythritol. Also, polyether polyols can be reacted with the polycarboxylic acids to form the polyester polyols as mentioned in one process.

In the practice of this invention the isopropyl or tert-butyl o-tolidine is used as the chain extender for the polyurethane/urea elastomer or as a component of the chain extender to provide urea groups with the elastomer. The small chain extender groups form "hard" segments in the elastomer and improve the structural stability and tensile modulus of the resulting polyurethane/urea elastomer. For purposes of this invention, it is preferred that the sole chain extending agent is the tert-butyl o-tolidine, but in many cases up to 504 of the equivalent weight of the chain extending system can comprise other aromatic diamines, short chain diols, etc. The type and ratio of chain extending agent is selected on the basis of the properties desired, e.g. faster or slower reaction rate, etc. Short or long chain polyols can also be formulated with the isopropyl or tert-butyl o-tolidine, and preferably the di(tert-butyl-o-tolidine) to produce a chain extender mix. Such polyols include ethylene glycol, propylene glycol, butanediol, glycerol and others conventionally used. The long chain polyols suited as a component for the chain extending system are those used for formulating the prepolymer.

The following examples are provided to illustrate various embodiments of the invention and are not intended to restrict the scope thereof.

EXAMPLES 1–8

Reaction of o-Tolidine with Isobutylene

A 50 mL autoclave was charged with o-tolidine (5.6 g, 26.4 mmol) and 1.12 g of catalyst. The reactor was sealed and pressure checked at 800 psig, purged with $N_2$ and liquid isobutylene (24 mL, 14.4 g, 0.26 mol) was admitted to the reactor by means of a piston pump. The reaction mixture was heated to 175° C. and then pressured to 800 psig with nitrogen. After 3 hours (h) at 175° C. the reaction vessel was cooled to room temperature, vented, and the residue was dissolved in tetrahydrofuran (THF). Filtration to remove the catalyst and analysis by GLC provided the results reported in Table 1.

TABLE 1

Effect of Catalyst on Rate and Selectivity in the Reaction of o-Tolidine with Isobutylene[a].

| Example | Catalyst | Conversion[c] | Selectivity[b] | | | | |
|---|---|---|---|---|---|---|---|
| | | | o | N | oo | oN | NN |
| 1 | Montmorillonite | 55.0 | 62.0 | 20.4 | 7.4 | 7.1 | 1.2 |
| 2 | $SiO_2/Al_2O_3$ | 48.1 | 56.5 | 29.9 | 4.1 | 7.5 | 2.0 |
| 3 | Nafion | 31.4 | 39.1 | 49.5 | 2.3 | 5.6 | 3.5 |
| 4 | SK500 | 28.2 | 30.4 | 60.9 | 0.8 | 3.5 | 4.3 |
| 5 | LZM8 | 20.6 | 25.7 | 68.4 | — | 2.4 | 3.4 |
| 6 | Amberlyst 15 | 16.8 | 10.1 | 86.9 | — | — | 3.0 |
| 7 | LZY82 | 10.2 | 10.8 | 86.2 | 1.3 | 1.9 | — |
| 8 | Y Alumina | 2.2 | 26.2 | 73.9 | — | — | — |

[a]Reaction conditions: 175° C., 800 psig, 3 h, R:N = 5, 20% catalyst based on o-tolidine.
[b]GLC, A%, o = 3-t-butyl-o-tolidine; N = N-t-butyl-o-tolidine; oo = 3,3'-di-t-butyl-o-tolidine; oN = 3,N'-di-t-butyl-o-tolidine; NN = N,N'-di-t-butyl-o-tolidine.
[c]Based on o-tolidine.

Examples 1–8, summarized in Table I illustrate that a number of different types of solid acids catalyze the reaction. Of these, the most efficient are amorphous catalysts of high Bronsted acidity such as montmorillonite clay and 134 $Al_2O_3$/87% $SiO_2$. In the case of amorphous alumino-silicate catalysts, the rate of reaction appears to be related roughly to the Bronsted acidity of the catalyst. Thus, the activity of the amorphous catalysts decreases in the order of montmorillonite, 134 $SiO_2/Al_2O_3$, and γ-alumina. Large pore zeolites decrease the rate of t-butylation, because of the diminished rate of egress of the alkylated material through the pore opening; partial dealumination increases the rate of reaction slightly (LZM8). Rare earth exchanged Y-zeolites (SK500) also exhibit slight rate enhancements relative to HY zeolite. Acidic ion exchange resins (Nafion, Amberlyst 15) are also effective catalysts for the reaction, although their use may be complicated somewhat by oligomerization of isobutylene.

EXAMPLES 9–12

Effect of Temperature on Equilibrium

These examples were performed in the manner of Examples 1–8. The temperatures were varied as indicated, and the results are reported in Table 2.

TABLE 2

Effect of Temperature on Equilibrium in Reactions of o-Tolidine with Isobutylene[a]

| Example | Temperature | Time[c] | Conversion[d] | Selectivity[b] | | | | |
|---|---|---|---|---|---|---|---|---|
| | | | | N | o | NN | oN | oo |
| 9 | 300° C. | 4 h | 9.0 | 17.4 | 80.1 | 2.5 | — | — |
| 10 | 250° C. | 21 h | 25.5 | 11.5 | 84.8 | — | 3.7 | — |
| 11 | 200° C. | 15 h | 68.7 | 7.1 | 66.5 | 0.6 | 4.3 | 21.4 |
| 12 | 150° C. | 64 h | 97.2 | 2.5 | 30.9 | 0.5 | 11.7 | 54.4 |

[a]Reaction Conditions: Montmorillonite, R:N = 5, 800 psig.
[b]GLC A%; o = 3-t-butyl-o-tolidine; N = N-t-butyl-o-tolidine; oo = 3,3'-di-t-butyl-o-tolidine; oN = 3,N'-di-t-butyl-o-tolidine; NN = N,N'-di-t-butyl-o-tolidine.
[c]Approximate time to reach equilibrium.
[d]Based on o-tolidine.

Examples 9–12 demonstrate that the equilibrium conversions and the ring/N selectivity for the t-butylation reaction are quite temperature sensitive with lower temperatures favoring both increased conversion and ring/N selectivity. In order to maximize the yield of ring alkylated products, it is, therefore, desirable to run at as low a temperature as possible. Unfortunately, reduction of the reaction temperature results in slowing of the reaction rate such that at temperatures below about 150° C., the process becomes impractical.

EXAMPLES 13 AND 14

Effect of Stoichiometry

The procedures of Examples 1–8 were repeated except that the stoichiometry was varied. Table 3 sets forth the conditions.

TABLE 3

Effect of Stoichiometry on Rate and Selectivity

| Example | R:N | Conversion[c] | Selectivity[b] | | | | |
|---|---|---|---|---|---|---|---|
| | | | o | N | oo | oN | NN |
| 13 | 5 | 55.0 | 63.1 | 20.7 | 7.6 | 7.3 | 1.1 |
| 14 | 3 | 51.2 | 58.2 | 22.5 | 5.5 | 6.6 | 7.2 |

[a]Reaction conditions: 175° C., 800 psig, 3 h, 20% montmorillonite based on o-tolidine.
[b]GLC Area %; o = 3-t-butyl-o-tolidine; N = N-t-butyl-o-tolidine; oo = 3,3'-di-t-butyl-o-tolidine; oN = 3,N'-di-t-butyl-o-tolidine; NN = N,N'-di-t-butyl-o-tolidine.
[c]Based on o-tolidine.

These examples demonstrate that by decreasing the R:N ratio from 5 to 3, there is little effect on the conversion or selectivity of the reaction. The practical value of this observation is that reactor productivity may be increased.

EXAMPLE 15–18

Effect of Catalyst Loading

These examples were performed in the manner of Examples 1–8 except for using the catalyst quantities given in Table 4.

TABLE 4

Effect of Catalyst Loading on Rate of Reaction of o-Tolidine with Isobutylene[a]

| Example | Catalyst Loading[b] | $k\ (s^{-1})$[c] | $k_{rel}$ | $t_{1/2}$ |
|---|---|---|---|---|
| 15 | 5% | $1.98 \times 10^{-5}$ | 1.0 | 9.7 h |
| 16 | 10% | $5.36 \times 10^{-5}$ | 2.7 | 3.6 h |
| 17 | 20% | $8.29 \times 10^{-5}$ | 4.2 | 2.3 h |
| 18 | 50% | $19.45 \times 10^{-5}$ | 9.8 | 1.0 h |

[a]Reaction conditions: 175° C., 800 psig, montmorillonite, R:N = 5.
[b]Based on o-tolidine.
[c]Rate constant for disappearance of o-tolidine.

These examples illustrate that in batch reactions, the rate of reaction is proportional to the catalyst loading.

EXAMPLES 19–26

Pot Life of Alkylated Tolidines as Polyurethane Chain Extenders

Pot life tests were performed by dissolving the chain extender (1 eq) in CAPA 200 (a polycaprolactone of 274 equivalent weight, 1 eq) in a stainless steel test cup and preconditioning this mixture at 50° C. for 1 hour. The homogeneity of this mixture was ascertained, and Adiprene 167 (a TDI-terminated 1000 molecular weight polytetramethyleneglycol, 2 equivalents) thermostatted at 50° C. was carefully layered on top. The test cup was placed in a thermostatted block on the test apparatus and a perforated plunger driven at constant pressure by a reciprocating air motor was activated. Frequency data for the plunger were stored on a minicomputer and later converted to relative viscosity. A plot of relative viscosity vs time was produced. The time required for the mixture to reach a relative viscosity of 5000 ($t_{5000}$), a value which provides a concise reactivity comparison for various chain extenders, was recorded. The viscosity profiles were fit to a polynominal of the form $$h = \exp\{K + At + Bt^2 = Ct^3 \equiv$$

where h is the relative viscosity and t is time. The magnitude of the A term is a measure of the initial chain extender reactivity analogous to a rate constant. The logarithm of A is thus proportional to the activation energy for reaction of the chain extender with the isocyanate.

The results set forth in Table 5 show

TABLE 5

Potlife Data for Alkylated Tolidines[a]

| | | Mixture Composition[b] | | | |
|---|---|---|---|---|---|
| Run | R | o | oo | T(°C.) | $t_{5000}$[c] |
| 19 | H | — | — | 50 | <0.5 |
| 20 | i-Pr | 94.2[d] | 5.5[d] | 50 | 1.1 |
| 21 | i-Pr | 0.2[d] | 97.7[d] | 50 | 2.1 |
| 22 | i-Pr | 0 | 100 | 50 | 1.8 |
| 23 | t-Bu | 100 | 0 | 50 | 7.1 |
| 24 | t-Bu | 73 | 26 | 50 | 13.1 |
| 25 | t-Bu | 73 | 26 | 80 | 4.0 |
| 26 | t-Bu | 0 | 100 | 80 | 6.0 |

[a]See Reference 11.
[b]GC FID Area %.
[c]Minutes; average of two determinations.
[d]Mixture of C-alkylated regioisomers.

Results presented in U.S. Pat. No. 4,745,223 (Burgoyne, et al.) teach that the rate of viscosity build is dependent on the reactivity of the least reactive amine in a diamine chain extender. This is because reaction of the first amine with the prepolymer does not effect chain extension. Consequently, there is not a significant increase in molecular weight and only a minimal effect on the viscosity of the mixture. Reaction of the second amine, however, links two prepolymers and results in a substantial increase in molecular weight and a corresponding increase in viscosity. For example, the composition represented by the formulas have the following t-5000 times:

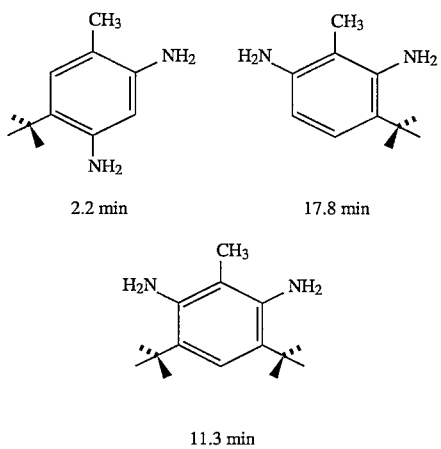

The 2.2 vs. 17.8 t-5000 between 5-t-butyl-2,4-toluenediamine and 3-t-butyl-2,6-toluenediamine indicate the reactivity of the second amine determines potlife.

The 17.8 vs. 11.3 t-5000 between 3-t-butyl-2,6-toluenediamine and 3,5-di-t-butyl-toluenediamine shows the remote t-butyl substituent accelerates the reaction of second amino substituent.

Thus, based on the prior art, the pot lives of the mono- and di-t-butyl derivatives of o-tolidine would be expected to be the same, or if there were significant electronic interaction between the rings, the potlife of the di-t-butyl derivative would be shortened. The fact that they are not is surprising and provides a means of adjusting the reactivity of the chain extender mixture to provide sufficient time for mixing and molding while maximizing productivity.

EXAMPLE 27

Production of Low Melting Mono and Di-t-Butyl-o-Tolidine Mixture

A gallon autoclave was charged with o-tolidine (375 g. 1.77 mol) and montmorillonite (150 g; 40 wt. % based on o-tolidine) The reactor was sealed and pressure checked at 1000 psig, purged with $N_2$ and liquid isobutylene (566 g, 10.11 mol) was added to the reactor from a pressurized cylinder. The reaction mixture was heated to 150° C. and then pressured to 870 psig with $N_2$. After 42 hrs. at 150° C., the reactor was cooled and THF (250 ml) was added via a piston pump. After filtration to remove the catalyst, analyses by GLC showed 89.8% conversion of o-tolidine to a mixture of N-t-butyl-o-tolidine (13.0%), 3-t-butyl-o-tolidine (48.2%), N,N-di-t-butyl-o-tolidine (3.6%), 3, N'-di-t-butyl-o-tolidine (22.7%), and 3,3'-di-t-butyl-o-tolidine (12.54). Fractional distillation of this mixture provided a sample of mixed t-butyl-o-tolidine, observed mp 63°–66° C.).

A differential scanning calorimeter scan for synthetic mixtures shows a much lower melting point than visual observations.

EXAMPLE 28

Melting Point Evaluation

The melting point of mono and di-t-butyl-o-tolidine and mixtures was obtained by two methods. To prepare the composition for testing, essentially pure 3-t-butyl-o-tolidine and 3,3'-di-t-butyl-o-tolidine were mixed together in specified amounts. The melting point of that composition was measured. One technique involved visual observation wherein heat was applied to the solid system and the temperature measured at the time of liquefaction. A second method for obtaining melting point correlations was through differential scanning calorimeter endotherms and these data were plotted in the drawing, where the temperature in °C. was plotted as the ordinate and the weight percent of 3,3'-di-t-butyl-o-tolidine was plotted as the abscissa. As can be seen from the diagram, an extremely low melting o-tolidine system can be obtained within a range of about 70–904 mono-t-butyl-o-tolidine and 10–30% di-t-butyl-o-tolidine in the o-tolidine system. Because of the unique melting point and pot life properties of the mixture, this particular range of mono and di-t-butyl-o-tolidine is particularly valuable for use in polyurethane synthesis.

EXAMPLE 29

Polyurethane Synthesis

A low melting mixture of mono- and di-t-butyl-o-tolidine (734 mono and 264 di) was evaluated in a cast elastomer system and compared to other curatives. The cast elastomer was prepared from a toluenediisocyanatepoly(tetramethyleneglycol) prepolymer having a free NCO content of about 6.2% by weight and less than about 0.14 free or unreacted toluenediisocyanate.

Polyurethane samples were prepared using conventional hand-mix techniques. Polyisocyanate prepolymers were degassed at 90°–100° C. and 5–15 mm Hg pressure. The diamine chain extenders were heated above their melting point, added to the degassed prepolymer at 75° C. and mixed by hand. The viscous mixture was then poured into a 8×8×1/16" aluminum mold preheated to 100° C. The mold and contents were pressed at 100° C. and 2400 psig in a hydraulic press until sufficient green strength developed to allow demolding. Following a 12-hour 100° C. post-cure, the elastomers were conditioned for 7 days at 23±2° C., 50±54 relative humidity (R.H.) prior to testing. The results are set forth in Table 6.

TABLE 6

| | Cast Elastomer Physical Properties PET-95a, 6.2% NCO, 95% Curative Stoichiometry | | | | | |
|---|---|---|---|---|---|---|
| CURATIVE | MOCA | POLACURE 740M | CYANACURE | ETHACURE | MDtBoT | TBTDA |
| Shore A | 95 | 95 | 95 | 95 | 88 | 93 |
| 100% Tensile (psig) | 2420 | 2320 | 1570 | 2310 | 2120 | 1460 |
| 200% Tensile (psig) | 3290 | 2910 | 2000 | 2920 | 3460 | 2280 |
| 300% Tensile (psig) | 4380 | 3590 | 2420 | 3840 | 5430 | 2520 |
| Break Tensile (psig) | 5500 | 4510 | 3600 | 5010 | 6070 | 3400 |
| % Elongation | 360 | 400 | 480 | 380 | 330 | 420 |
| Tear Resistance Die C(pli) tensile - ASTM D1708 die C tear - ASTM D624 hardness - ASTM D676 | 570 | 870 | 690 | 560 | 570 | 510 |

POLACURE, CYANACURE and ETHACURE are trademarks for amine chain extending agents commonly used in polyurethanes.
POLACURE is the di(p-aminobenzoate)ester of 1,3-propylene glycol.
CYANACURE is 1,2-di(2-aminophenylthio)ethane.
ETHACURE is an 80:20 mixture of 3,5-di(methylthio)-2,4-toluenediamine and 3,5-di(methylthio)-2,6-toluenediamine, respectively.

POLACURE, CYANACURE and ETHACURE are trademarks for amine chain extending agents commonly used in polyurethanes.

POLACURE is the di(p-aminobenzoate)ester of 1,3-propylene glycol.

CYANACURE is 1,2-di(2-aminophenylthio)ethane.

ETHACURE is an 80:20 mixture of 3,5-di(methylthio)-2,4-toluenediamine and 3,5-di (methylthio)-2,6-toluenediamine, respectively.

MDtBoT is a mixture of mono/di-t-butyl-o-tolidines (73% mono and 26.3% di-t-butyl-o-tolidine isomers).

TBTDA is an 80:20 mixture of 5-t-butyl-2,4-toluenediamine and 3-t-butyl-2,6-toluenediamine, respectively.

The above results show that cast elastomers prepared with MDtBoT have a lower Shore A hardness than other elastomers and yet have the highest break tensile strength. This is relatively unique in that elastomers normally become harder with increasing tensile strength. Polyurethane elastomers cured with diol chain extenders are soft, but have poor tensile and tear strength which limits their utility, e.g., to soft foams and low speed tires. In contrast, polyurethanes cured with diamine chain extenders have good tensile and tear strengths, but are hard. Consequently, it has been difficult to make soft polyurethane elastomers with good tensile and tear strengths. This unique combination of properties obtained with the t-butylated-o-tolidine chain extenders, particularly mixed mono and di-t-butyl-o-tolidines is particularly useful for rollers used in making paper and paper products, and tough, durable urethane coatings, e.g., for floors and for protecting the internal components of solids handling equipment from abrasive substrates.

EXAMPLES 30–32

Gas Barrier Polyimides

Performance of 3,3'-di-isopropyl-o-tolidine as a comonomer for a gas barrier polyimide is compared to that of o-tolidine and 3,3',5,5'-tetramethylbenzidine. Structures of the polymers tested are represented in the general formula:

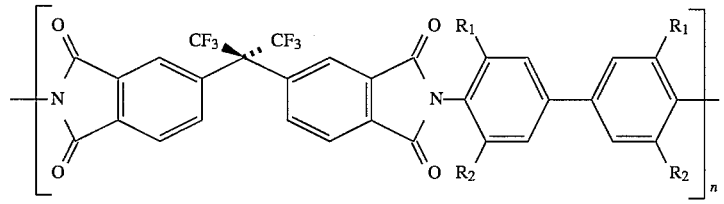

where $R^1$ and $R^2$ are designated in Table 7.

TABLE 7

| | Effects of ortho Alkyl Substituents on P(O₂) and α | | | |
|---|---|---|---|---|
| Example | $R^1$ | $R^2$ | $P^1$ | $\alpha^2$ |
| 30 | Me | H | 5.37 | 4.61 |
| 31 | Me | Me | 53.8 | 3.71 |
| 32 | Me | iPr | 84.4 | 3.30 |

$P(O_2)$= Permeability Coefficient = $\frac{scc}{sec} \frac{cm}{cm^2} \frac{1}{cm(Hg)} \times 10^{+10 (barrers)}$ Highest permeability and good selectivity for oxygen were obtained with polyimides derived from 3,3'-di-isopropyl-o-tolidine. Thus, polyimide membranes derived from 3,3-di-isopropyl-o-tolidine provide an effective means for separation of atmospheric oxygen from nitrogen under noncryogenic conditions.

What is claimed is:

1. In a polyurethane composition formed by reacting a polyisocyanate with a polyol and chain extended with an aromatic diamine, the improvement which comprises chain extending the polyurethane composition with an o-tolidine composition represented by the structure:

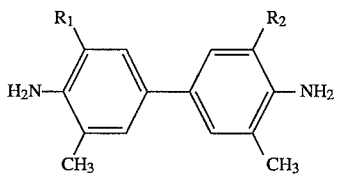

where $R_1$ is isopropyl or t-butyl and $R_2$ is hydrogen, isopropyl or t-butyl.

2. The polyurethane composition of claim 1 chain extended with 3-t-butyl-o-tolidine.

3. The polyurethane composition of claim 1 chain extended with 3,3'-di-t-butyl-o-tolidine.

4. The polyurethane composition of claim 1 chain extended with 3-isopropyl-o-tolidine.

5. The polyurethane composition of claim 1 chain extended with 3,3'-di-isopropyl-o-tolidine.

* * * * *